United States Patent
Amizur et al.

(10) Patent No.: US 9,924,316 B2
(45) Date of Patent: Mar. 20, 2018

(54) APPARATUS, SYSTEM AND METHOD OF RANGE ESTIMATION

(71) Applicant: INTEL IP CORPORATION, Santa Clara, CA (US)

(72) Inventors: Yuval Amizur, Kfar-Saba (IL); Uri Schatzberg, Kiryat Ono (IL)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/583,144

(22) Filed: Dec. 25, 2014

(65) Prior Publication Data
US 2016/0192138 A1 Jun. 30, 2016

(51) Int. Cl.
H04W 24/00 (2009.01)
H04W 4/02 (2018.01)

(52) U.S. Cl.
CPC .................................. H04W 4/023 (2013.01)

(58) Field of Classification Search
CPC ....... H04W 64/00; H04W 4/02; H04W 4/025; H04W 88/06; H04W 48/12; G01S 2013/468; G01S 5/0045; G01S 5/0221; G01S 5/14; G01S 3/72; G01S 3/8083; G01S 11/02; G01S 17/06; G01S 5/0284
See application file for complete search history.

(56) References Cited

U.S. PATENT DOCUMENTS

2015/0016379 A1* 1/2015 Nam ..................... H04B 7/0456
370/329
2015/0282112 A1* 10/2015 Bialer ....................... G01S 1/02
455/456.1

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
Wi-Fi Alliance Technical Committee P2P Task Group; Wi-Fi Peer-to-Peer (P2P) Technical Specification; Version 1.2; Dec. 14, 2011; 160 pages.
Voltz et al.; "Maximum Likelihood Time of Arrival Estimation for Real-Time Physical Location Tracking of 802.11a/g Mobile Stations in Indoor Environments"; ISBN: 0-7803-8416-4; IEEE Apr. 2004; pp. 585-591.

* cited by examiner

Primary Examiner — Kwasi Karikari
(74) Attorney, Agent, or Firm — Shichrur & Co.

(57) ABSTRACT

Some demonstrative embodiments include apparatuses, devices, systems and methods of range estimation. For example, a mobile device may include a radio to receive from an Access Point (AP) statistical channel information of a plurality of wireless communication channels in a region covered by the AP; a channel estimator to estimate, based on the statistical channel information, a time of arrival (ToA) of a wireless communication signal from the AP via a line of sight (LOS) channel between the AP and the mobile device; and a range estimator to estimate a range between the mobile device and the AP based on the ToA.

13 Claims, 6 Drawing Sheets

US 9,924,316 B2

APPARATUS, SYSTEM AND METHOD OF RANGE ESTIMATION

TECHNICAL FIELD

Embodiments described herein generally relate to range estimation.

BACKGROUND

Outdoor navigation is widely deployed thanks to the development of various global-navigation-satellite-systems (GNSS), e.g., Global Positioning System (GPS), GALILEO, and the like.

Recently, there has been a lot of focus on indoor navigation. This field differs from the outdoor navigation, since the indoor environment does not enable the reception of signals from GNSS satellites. As a result, a lot of effort is being directed towards solving the indoor navigation problem. This problem does not yet have a scalable solution with satisfactory precision.

One solution for indoor navigation includes a Time-of-Flight (ToF) measurement method (also referred to as "Fine Timing Measurement (FTM)"). The ToF may be defined as the overall time a signal propagates from a first station, e.g., a user ("client") mobile device, to a second station, e.g., an access point (AP), and back to the first station. A range between the first and second stations may be calculated based on the ToF value, for example, by dividing the ToF value by two and multiplying the result by the speed of light.

An estimated location of the first station may be determined by calculating two or more ranges between the first station and two or more other stations, e.g., other APs, by utilizing a suitable method, e.g., a trilateration method.

The accuracy of the estimated location depends on the accuracy of the ToF measurements. There is a need for mechanisms to enable accurate ToF measurements.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
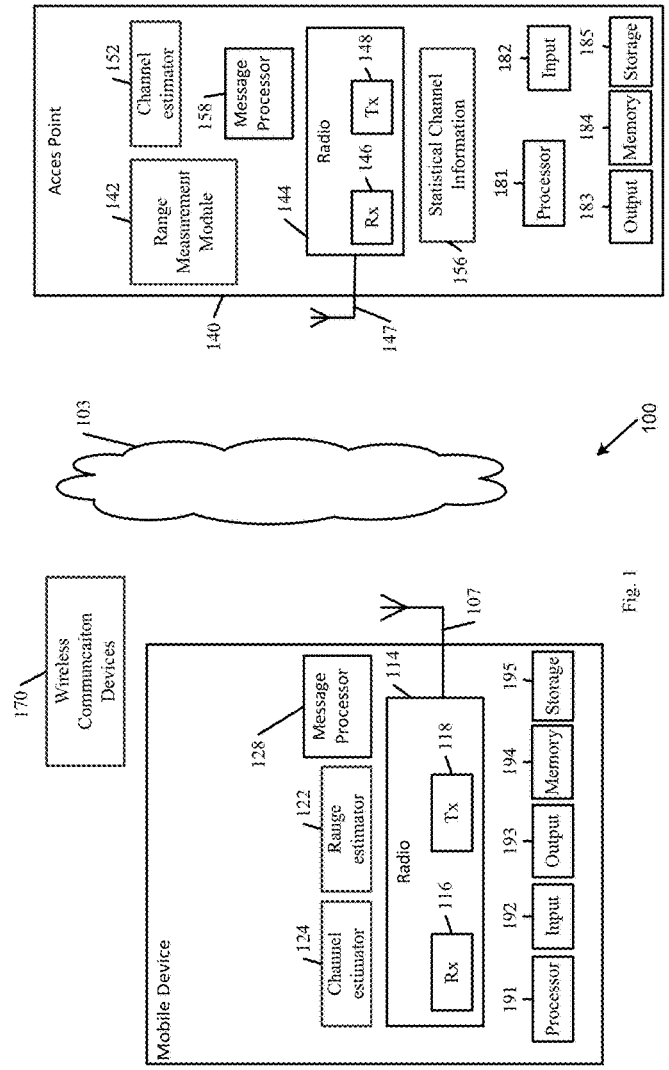
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Bluetooth device, an Internet of Things (IoT) device, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012; *IEEE*802.11*ac*-2013 (*"IEEE P*802.11*ac*-2013, *IEEE Standard for Information Technology—Telecommunications and Information Exchange Between Systems—Local and Metropolitan Area*

Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE 802.11Revmc; IEEE 802.11x)) and/or future versions and/or derivatives thereof, devices and/or networks operating in accordance with existing Wireless Fidelity (WiFi) Alliance (WFA) Peer-to-Peer (P2P) specifications (WiFi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, a cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN. Other embodiments may be used in conjunction with any other suitable wireless communication network, for example, a wireless area network, a "piconet", a WPAN, a WVAN and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is at least one addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information, audio, video, and/or signals via a wireless medium (WM) 103. For example, system 100 may include a wireless communication device 102, one or more wireless communication devices 170 and/or an Access Point (AP) 140.

In some demonstrative embodiments, wireless medium 103 may include, for example, a radio channel, a cellular channel, an RF channel, a Wireless Fidelity (WiFi) channel, an IR channel, and the like. One or more elements of system 100 may optionally be capable of communicating over any suitable wired communication links.

In some demonstrative embodiments, device 102 may include a mobile or a portable device.

In some demonstrative embodiments, device 102, may include, for example, a mobile computer, a laptop computer, a User Equipment (UE), an Internet of Things (IoT) device, a notebook computer, a tablet computer, an Ultrabook™ computer, a mobile internet device, a handheld computer, a handheld device, a PDA device, a handheld PDA device, an on-board device, an off-board device, a hybrid device (e.g., combining cellular phone functionalities with PDA device functionalities), a consumer device, a mobile or portable device, a mobile phone, a cellular telephone, a PCS device, a PDA device which incorporates a wireless communication device, a mobile or portable GPS device, a relatively small computing device, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Personal Media Player (PMP), a digital video camera (DVC), a gaming device, a Smartphone, or the like.

In some demonstrative embodiments, AP 140 may include a non-mobile or a static device.

In some demonstrative embodiments, AP 140 may include, for example, a desktop computer, a router, a server, or the like.

In some demonstrative embodiments, UE 102 may include, for example, one or more of a processor 191, an input unit 192, an output unit 193, a memory unit 194, and a storage unit 195; and/or AP 140 may include, for example, one or more of a processor 181, an input unit 182, an output unit 183, a memory unit 184, and a storage unit 185. UE 102 and/or AP 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of UE 102 and/or AP 140 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of UE 102 and/or of one or more suitable applications. Processor 181 executes instructions, for example, of an Operating System (OS) of AP 140 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by UE 102. Memory unit 184 and/or storage unit 185, for example, may store data processed by AP 140.

In some demonstrative embodiments, device 102, devices 170, and AP 140 may include one or more radios to perform wireless communication between device 102, devices 170, AP 140, and/or one or more other wireless communication devices. For example, device 102 may include at least one radio 114, and/or AP 140 may include at least one radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may include circuitry, logic, modulation elements, demodulation elements, amplifiers, analog to digital and digital to analog converters, filters, and/or the like. For example, radios 114 and/or 144 may include or may be implemented as part of a wireless Network Interface Card (NIC), and the like.

In some demonstrative embodiments, device 102, devices 170, and AP 140 may be configured to communicate a MIMO communication over two or more MIMO channels between device 102, devices 170, AP 140, and/or one or more other wireless communication devices.

In one example, radio 144 may communicate with a device of devices 170 over the two or more MIMO channels.

In another example, device 102 may communicate with AP 140 over the two or more MIMO channels.

In some demonstrative embodiments, radios 114 and/or 144 may include, or may be associated with, one or more antennas 107 and/or 147, respectively.

In one example, device 102 may include a single antenna 107. In other example, device 102 may include two or more antennas 107.

In one example, AP 140 may include a single antenna 147. In other example, AP 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102, devices 170 and/or AP 140 may be located in an indoor environment, for example, a mall, a building, an office and/or the like.

In other embodiments, device 102, devices 170 and/or AP 140 may be located in any other environment, e.g., an indoor and/or an outdoor location.

In some demonstrative embodiments, device 102 may include a range estimator 122 to estimate a range between device 102 and AP 140.

In some demonstrative embodiments, range estimator 122 may determine the range between device 102 and AP 140, for example, to estimate a location of device 102 in the indoor environment.

In some demonstrative embodiments, range estimator 122 may perform a range measurement procedure with AP 140, for example, to determine the range between device 102 and AP 140.

In some demonstrative embodiments, AP 140 may include a range measurement module 142 to perform the range measurement procedure with device 102.

In some demonstrative embodiments, range estimator 122 and/or range measurement module 142 may include circuitry and or logic, e.g., one or more processors including circuitry, memory circuitry, Media-Access Control (MAC) circuitry, Physical Layer (PHY) circuitry, and/or any other circuitry and/or logic, configured to perform the functionality of range estimator 122 and/or range measurement module 142. Additionally or alternatively, one or more functionalities of range estimator 122 and/or range measurement module 142 may be implemented by logic, which may be executed by a machine and/or one or more processors, e.g., as described below.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, AP 140 may include a message processor 158 configured to generate, process and/or access one or messages communicated by AP 140.

In one example, message processor 158 may be configured to generate one or more messages to be transmitted by AP 140, and/or message processor 158 may be configured to access and/or to process one or more messages received by AP 140, e.g., as described below.

In some demonstrative embodiments, message processors 128 and/or 158 may include circuitry and or logic, e.g., one or more processors including circuitry, memory circuitry, Media-Access Control (MAC) circuitry, Physical Layer (PHY) circuitry, and/or any other circuitry and/or logic, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of range estimator 122, and/or at least part of the functionality of message processor 158 may be implemented as part of range measurement module 142.

In other embodiments, the functionality of message processor 128 may be implemented as part of any other element of device 102, and/or the functionality of message processor 158 may be implemented as part of any other element of device 140.

In one example, message processors 128 and/or 158 may be configured to generate, process and/or access one or messages of the range measurement procedure.

In some demonstrative embodiments, the range measurement procedure may include a Fine Timing Measurement (FTM) procedure.

In some demonstrative embodiments, the range measurement procedure may include a Time of Flight (ToF) measurement procedure.

In other embodiments, the range measurement procedure may include any other ranging and/or location estimation procedure and/or sequence.

In some demonstrative embodiments, the ToF may be defined as the overall time a signal propagates from a first station, e.g., device 102, to a second station, e.g., AP 140, and back to the first station. A range between the first and second stations may be determined based on the ToF value, for example, by dividing the ToF value by two and multiplying the result by the speed of light.

In some demonstrative embodiments, range estimator 122 may determine the range between device 102 and AP 140 based on a Time of Arrival (ToA) of a wireless communication signal from AP 140, for example, via a line of sight (LOS) channel between device 102 and AP 140, e.g., as described below.

In some demonstrative embodiments, the LOS channel (also referred to as the "LOS path") between two devices, e.g., devices 102 and 140, may include, for example, the shortest direct line between the two devices, e.g., between devices 102 and AP 140.

In some demonstrative embodiments, device 102 may include a channel estimator 124 configured to estimate the LOS channel between device 102 and AP 140, e.g., as described below.

In some demonstrative embodiments, channel estimator 124 may include circuitry and or logic, e.g., one or more processors including circuitry, memory circuitry, and/or any other circuitry and/or logic, configured to perform the functionality channel estimator 124. Additionally or alternatively, one or more functionalities of channel estimator 124 may be implemented by logic, which may be executed by a machine and/or one or more processors, e.g., as described below.

In some demonstrative embodiments, at least part of the functionality of channel estimator 124 may be implemented as part of range estimator 122. In other embodiments, the functionality of channel estimator 124 may be implemented as part of any other element of device 102.

In some demonstrative embodiments, channel estimator 124 may estimate the LOS channel between devices 102 and 140 based on a LOS channel estimation of the wireless communication signal as received at receiver 116.

In some demonstrative embodiments, channel estimator 124 may be configured to estimate the ToA of the wireless communication signal based on the LOS channel estimation.

In some demonstrative embodiments, the range determined by range estimator 122 may be inaccurate, for example, if the ToA is not accurately determined.

In some demonstrative embodiments, the ToA may be determined inaccurately, for example, if the LOS channel estimation of the LOS channel is not accurate.

In one example, accurate estimation of the LOS channel may be difficult, for example, when subject to a multipath effect. The multipath effect may occur, for example, when device 102 receives multiple replicas of the wireless communication signal from AP 140 via multiple paths over time.

According to this example, selecting a path from the multiple paths, which is not the LOS path, e.g., a path via which a first replica in time is to be received, may result in an error in the range, e.g., of several meters.

Some demonstrative embodiments may enable channel estimator 124 estimate ToA of the wireless communication signal from AP 140 via the LOS path, e.g., at an increased level of accuracy.

In some demonstrative embodiments, channel estimator 124 may estimate the ToA of the wireless communication signal from AP 140 via the LOS path, for example, based on statistical channel information, e.g., as described below.

In some demonstrative embodiments, device 102 may receive the statistical channel information, for example, from AP 140, e.g., as described below.

In some demonstrative embodiments, the statistical channel information may be configured provide information based on a plurality of wireless communication channels at the location of device 102 and/or at an area of the location of device 102, e.g., as described below.

In some demonstrative embodiments, estimating the ToA at device 102 of the wireless communication signal from AP 140 via the LOS path based on the information on the plurality of wireless communication channels may increase the accuracy of the estimated ToA at device 102. ToA In some demonstrative embodiments, AP 140 may include a channel estimator 152 to determine statistical channel information 156 of a plurality of wireless communication channels in a region covered by AP 140, e.g., as described below.

In some demonstrative embodiments, channel estimator 152 may include circuitry and or logic, e.g., one or more processors including circuitry, memory circuitry, and/or any other circuitry and/or logic, configured to perform the functionality channel estimator 152. Additionally or alternatively, one or more functionalities of channel estimator 152 may be implemented by logic, which may be executed by a machine and/or one or more processors, e.g., as described below.

In some demonstrative embodiments, statistical channel information 156 may include channel autocorrelation information.

In some demonstrative embodiments, the channel autocorrelation information may include a covariance matrix, e.g., as described below.

In some demonstrative embodiments, channels estimator 152 and/or range measurement module 142 may cause message processor 158 to generate a message including statistical channel information 156, and radio 144 to send the message to device 102, for example, when device 102 is within the region covered by AP 140.

In some demonstrative embodiments, radio 114 may receive the message including statistical channel information 156 from AP 140.

In some demonstrative embodiments, channel estimator 124 may estimate the ToA of the wireless communication signal from AP 140 via the LOS channel between AP 140 and device 102, for example, based on the statistical channel information 156 from AP 140.

In some demonstrative embodiments, the estimated ToA may have an increased accuracy, for example, if estimated by channel estimator 124 based on the statistical channel information 156 from AP 140, e.g., as described below.

In some demonstrative embodiments, range estimator 122 may estimate the range between device 102 and AP 140 based on the estimated ToA determined by channel estimator 124, e.g., as described above.

In some demonstrative embodiments, the estimated range between device 102 and AP 140 may have an increased accuracy, for example, if range estimator 122 estimates the range between device 102 and AP 140 based on the estimated ToA, which is determined based on the statistical channel information 156 from AP 140.

In some demonstrative embodiments, device 102 and AP 140 may communicate statistical channel information 156 in a message of the range measurement procedure between device 102 and AP 140.

In one example, device 102 and AP 140 may communicate statistical channel information 156 in a message of the FTM procedure.

In another example, device 102 and AP 140 may communicate statistical channel information 156 in a message of the ToF measurement procedure.

In other embodiments, device 102 and AP 140 may communicate statistical channel information 156 in any other message, e.g., a dedicated message, or any other message of any other procedure, for example, in a probe request/response sequence, an association sequence, and the like.

In some demonstrative embodiments, radio 144 may send statistical channel information 156 to device 102 in a periodic broadcast massage.

In some demonstrative embodiments, radio 114 may receive statistical channel information 156 in the periodic broadcast massage from AP 140.

In one example, radio 114 may receive statistical channel information 156 in the periodic broadcast massage, for example, when device 102 is within the region covered by AP 140.

In some demonstrative embodiments, device 102 and AP 140 may communicate a request message from device 102 to request statistical channel information 156.

In some demonstrative embodiments, channel estimator 124 and/or range estimator 122 may cause message processor 128 to generate the request message, and radio 114 to send the request message to AP 140, for example, to request statistical channel information 156.

In some demonstrative embodiments, radio 144 may receive the request message, and may send statistical channel information 156 to device 102, e.g., in response to the request message.

In some demonstrative embodiments, radio 114 may receive statistical channel information 156, e.g., in response to the request message.

In some demonstrative embodiments, range estimator 122 may estimate the range between device 102 and AP 140, based on the statistical channel information 156, e.g., as described above.

In some demonstrative embodiments, communicating statistical channel information 156 from AP 140 to device 102 may enable device 102 to estimate the ToA at an increased accuracy, which, in turn, may enable estimating the range between device 102 and AP 140 with increased accuracy.

Some demonstrative embodiments may enable channel estimator 152 to determine statistical channel information 156, for example, even without analytically deriving an autocorrelation matrix for real wireless communication channels between device 102 and AP 140.

In one example, it may be inaccurate and/or inefficient to determine a channel autocorrelation for real wireless communication channels, for example, using a simulated channel model, for example, since a theoretical model of the region covered by AP 140 may not represent and/or may be different from actual properties of the region.

In another example, determining the channel autocorrelation information for the real wireless communication channels may be difficult, for example, since such estimation may require normalizing of the wireless communication channels in time, e.g., to align the LOS path of the wireless communication channels to the same starting point in time. The normalizing of the wireless communication channels in time may require knowledge of a distance between a transmitter and a receiver of the signals over the wireless communication channels, e.g., AP 140 and device 102, for example, to better estimate of the LoS time, e.g., although, in some circumstances additional information may be used, e.g., to further improve the accuracy of the LoS time.

According to these examples, determining the channel autocorrelation information may be complex and/or inefficient, for example, as it may require performing real measurements of the wireless communication channels and/or using a controlled environment, in which distances between elements of the environment are known.

In some demonstrative embodiments, channel estimator 152 may determine statistical channel information 156, for example, in a dynamic and/or ad-hoc environment, for example, at substantially any environment, e.g., an environment in which the distances between elements of the environment are not known a-priori, and/or even if real measurements of the wireless communication channels are not known a-priori.

In some demonstrative embodiments, channel estimator 152 may determine statistical channel information 156, for example, based on MIMO communications between AP 140 and one or more of devices 170, e.g., as described below.

In some demonstrative embodiments, using the MIMO communications may enable channel estimator 152 to estimate statistical channel information 156, for example, even without user intervention, e.g., of a user of device 102, during regular navigation in the region controlled by AP 140, e.g., as described below.

In some demonstrative embodiments, AP 140 may communicate the MIMO communications with a device 170 over two or more wireless communication channels.

In some demonstrative embodiments, channel estimator 152 may estimate the ToA via the LOS path based on channel estimations of the two or more MIMO channels between AP 140 and the device 170.

In one example, the two or MIMO channels may have substantially the same ToA of a wireless communication signal received via the LOS path between the device 170 and AP 140. According to this example, the substantially simultaneous ToA over the two or more MIMO channels may enable channel estimator 152 to determine statistical channel information 156, for example, even without user intervention, without a-priori knowledge of the environment, and/or without a-priori knowledge of real measurements of the wireless communication channels.

In some demonstrative embodiments, channel estimator 152 may determine the statistical channel information 156 corresponding to the region covered by AP 140, for example, based on channel estimations of a plurality of wireless communication channels between AP 140 and one or more of the wireless communication devices 170 in the region of AP 140, e.g., as described below.

In some demonstrative embodiments, channel estimator 152 may determine statistical channel information 156, for example, based on a plurality of LOS estimations of a respective plurality of LOS paths between AP 140 and devices 170, e.g., as described below.

Some demonstrative embodiments may enable channel estimator 152 to determine and/or update statistical channel information 156, for example, in a dynamic manner, for example, to accommodate for changes in the environment, e.g., as described below.

In some demonstrative embodiments, channel estimator 152 may determine statistical channel information 156, for example, by applying channel estimations of the LOS paths to pre-calculated statistical channel information.

In some demonstrative embodiments, the pre-calculated statistical channel information may include an average pre-calculated channel autocorrelation.

In some demonstrative embodiments, the average pre-calculated channel autocorrelation may be based on an average of a plurality of real measurements of a plurality of wireless communication channels in a plurality of regions, different from the region of AP 140.

In some demonstrative embodiments, the average pre-calculated channel autocorrelation may be most suitable for an average wireless communication channel in an average region. In contrast, the average pre-calculated channel autocorrelation may be less suitable for a real environment.

In some demonstrative embodiments, channel estimator 152 may dynamically update statistical channel information 156, for example, based on one or more changes in the plurality of channel estimations and/or the plurality of LOS estimations, e.g., with respect to the one or more devices 170.

In some demonstrative embodiments, channel estimator 152 may update statistical channel information 156, for example, based on a channel estimation of a LOS channel between a device 170 and AP 140.

In some demonstrative embodiments, channel estimator 152 may estimate at receiver 146 the LOS channel between the device 170 and AP 140.

In some demonstrative embodiments, channel estimator 152 may estimate a ToA of a wireless communication signal from device 170 via a LOS path between AP 140 and the device 170.

In some demonstrative embodiments, channel estimator 152 may estimate the ToA, for example, based on the channel estimation of the LOS path between AP 140 and the device 170.

In some demonstrative embodiments, channel estimator 152 may estimate the ToA, for example, based on statistical channel information 156.

In some demonstrative embodiments, channel estimator may estimate the ToA, for example, based on a plurality of channels of a MIMO communication between the device 170 and AP 140.

In some demonstrative embodiments, channel estimator 152 may update statistical channel information 156, for example, based on the estimated ToA.

In some demonstrative embodiments, channel estimator 152 may estimate a plurality of ToAs of a plurality of wireless communication signals from one or more of devices 170 via LOS paths between AP 140 and the one or more devices 170.

In some demonstrative embodiments, channel estimator 152 may update statistical channel information 156, for example, based on the plurality of ToAs.

In one example, channel estimator 152 may estimate the ToAs of all wireless communication signals from a device 170, for example, when the device 170 is within or enters the region of AP 140. Channel estimator 152 may update the statistical channel information 156, for example based on the estimated ToAs, e.g., as describe below.

In some demonstrative embodiments, channel estimator 152 may repeat updating statistical channel information 156, for example, for a predefined number of times.

In one example, channel estimator 152 may repeat updating statistical channel information 156, for example, until statistical channel information 156 reaches a suitable level of accuracy, e.g., an accuracy, which may enable to estimate a range between AP 140 and a device within the region covered AP 140 at an acceptable error.

In some demonstrative embodiments, range estimator 152 may calculate the channel autocorrelation information, for example, based on one or more mathematical calculations, e.g., as described below.

In some demonstrative embodiments, a channel response in a time domain, denoted h(t), of multipath channel to communicate a wireless communication signal and AP 140 and the device 170 may be determined, e.g., as follows:

$$h(t) = \sum_{i=0}^{L-1} a_i \delta(t - \tau_i) \quad (1)$$

wherein $\tau_i$ denotes a time of arrival of an i-th component of the wireless communication signal via a respective i-th path, i= ... L−1, wherein L denotes a number of paths, wherein $\tau_0$ denotes a time of arrival of LOS component of the wireless communication signal via a LOS path, wherein $a_i$ denotes an amplitude of the multipath channel, and wherein $\delta$ denotes a delta function.

In some demonstrative embodiments, the channel response in a frequency domain, denoted $H_k$, of the multipath channel with respect to a k-th subcarrier may be expressed, e.g., as follows:

$$H_k = \sum_{i=0}^{L-1} a_i e^{-j\frac{2\pi}{T}k\tau_i} \quad (2)$$

wherein T denotes a time period between samples of the channel response, and wherein $\bar{\tau}_i$ denotes an arrival time of the i-th path of the multipath channel.

In some demonstrative embodiments, a zero delay channel response in the time domain, denoted $h_0(t)$, of the multipath channel, for example, when removing a delay of the LOS path may be expressed, e.g., as follows:

$$h_0(t) = h(t + \tau_0) = \sum_{i=0}^{L-1} a_i \delta(t + \tau_0 - \tau_i) = \sum_{i=0}^{L-1} a_i \delta(t - \bar{\tau}_i) \quad (3)$$

In some demonstrative embodiments, the zero delay channel response in the frequency domain, denoted $H_0(w)$, of the of the multipath channel may be expressed, e.g., as follows:

$$H_0(\omega) = \sum_{i=0}^{L-1} a_i e^{-j\omega\bar{\tau}_i} \quad (4)$$

wherein, for the k-th subcarrier:

$$\omega_k = \frac{2\pi}{T}k \quad (5)$$

In some demonstrative embodiments, the channel response in the frequency domain, denoted $H_k$, of the $k^{th}$ subcarrier, for example, when removing the delay of the LOS, may be expressed, e.g., as follows:

$$H_k = H_0\left(\frac{2\pi}{T}k\right) \quad (6)$$

In some demonstrative embodiments, a subcarrier channel frequency response vector, denoted h, may be defined, e.g., as follows:

$$h=[H_0, H_1, \ldots, H_{N-1}]^T \quad (7)$$

In some demonstrative embodiments, a covariance matrix, denoted $K_h$, may be expressed, e.g., as follows:

$$K_h = E\{hh^*\} \quad (8)$$

wherein the star "*" denotes a complex conjugate response.

In some demonstrative embodiments, a channel estimation, denoted $\bar{h}$, at receiver 116 after removing the delay of the LOS path may be expressed, e.g., as follows:

$$\bar{h}=[\overline{H_0}, \overline{H_1}, \ldots, \overline{H_{n-1}}]^T \quad (9)$$

In some demonstrative embodiments, channel estimator 152 may determine statistical channel information 156 to include an estimated covariance matrix, denoted $k_y$, by averaging a plurality of channel estimations $\bar{h}$, e.g., as follows:

$$K_y = \Sigma \bar{h}\bar{h}^* \quad (10)$$

In some demonstrative embodiments, assuming white Gaussian noise, the covariance matrix $k_y$, may be expressed, e.g., as follows:

$$K_y = K_h + K_n = K_h + \sigma^2 I \quad (11)$$

In some demonstrative embodiments, channel estimator 152 may determine the statistical channel information 156 to include the covariance matrix $k_y$.

In some demonstrative embodiments, determining statistical channel information 156 based on the channel estimations of wireless communication channels between devices 170 and AP 140, and/or based on the plurality of LOS estimations of LOS paths between devices 170 and AP 140 may result in statistical channel information 156 having an increased level of accuracy. This increased accuracy of statistical channel information 156 may enable indoor navigation in the region covered by AP 140, e.g., with increased accuracy of range measurements, e.g., as described below.

In one example, the increased accuracy of the range measurements may be achieved, for example, due to the use of statistical channel information 156 corresponding to the region covered by AP 140, e.g., instead of generic pre-calculated an average channel autocorrelation.

Figure 2:
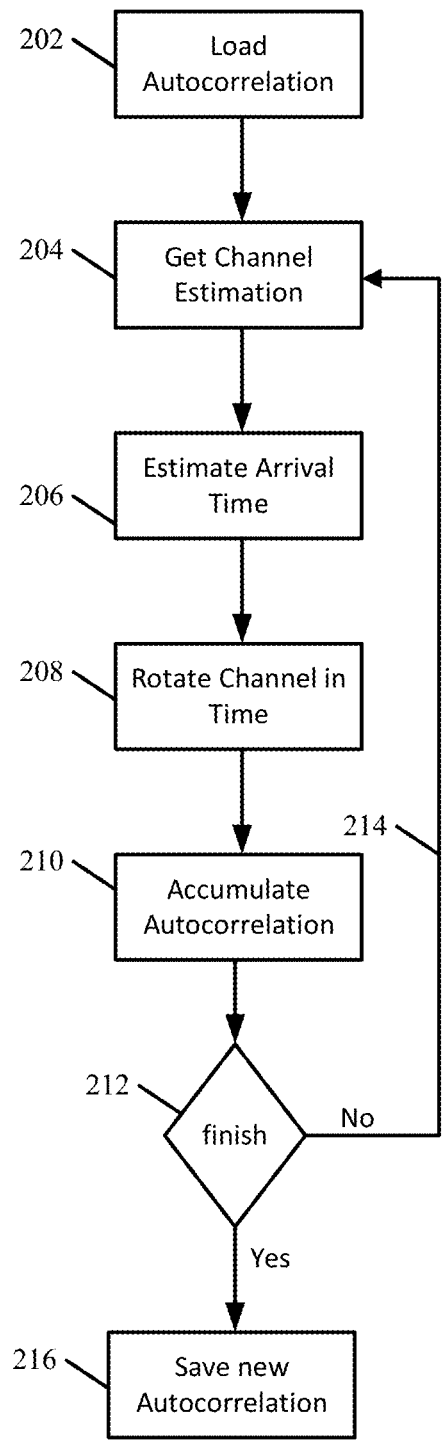
FIG. 2 is a schematic flow-chart illustration of a method of generating channel autocorrelation information, in accordance with some demonstrative embodiments.

Reference is made to FIG. 2, which schematically illustrates a method 200 of generating channel autocorrelation information, in accordance with some demonstrative embodiments. For example, one or more of the operations of the method of FIG. 2 may be performed by a wireless communication system, e.g., system 100 (FIG. 1); an AP, e.g., AP 140 (FIG. 1); a radio, e.g., radio 144 (FIG. 1); a channel estimator, e.g., channel estimator 152 (FIG. 1); and/or a range measurement module, e.g., range measurement module 142 (FIG. 1).

As indicated at block 202, the method may include uploading pre-calculated channel autocorrelation information. For example, channel estimator 152 (FIG. 1) may upload the pre-calculated channel autocorrelation information, for example, from memory 184 (FIG. 1).

As indicated at block 204, the method may include estimating a wireless communication channel between an AP and a device in a region covered by the AP. For example, channel estimator 152 (FIG. 1) may estimate the LOS path between AP 140 (FIG. 1) and a device of devices 170 (FIG. 1), e.g., as described above.

As indicated at block 206, the method may include estimating a ToA of a wireless communication signal via the wireless communication channel, for example, based on the pre-calculated channel autocorrelation information. For example, channel estimator 152 (FIG. 1) may estimate the ToA of the wireless communication signal via the LOS paths between AP 140 (FIG. 1) and the device 170 (FIG. 1), for example, based on statistical channel information 156 (FIG. 1), e.g., as described above.

As indicated at block 208, the method may include aligning the wireless communication channel, for example, to align the LOS path to a zero set time. For example, channel estimator 152 (FIG. 1) may align the wireless communication channel, for example, such that the LOS path is aligned to a zero set time, e.g., as described above.

As indicated at block 210, the method may include combining the estimation of the LOS path with the pre-calculated channel autocorrelation information. For example, channel estimator 152 (FIG. 1) may add the LOS channel estimation of the LOS path to the pre-calculated statistical channel information, e.g., as described above.

As indicated at block 212 the method may include determining whether or not to repeat the operations of blocks 202-210, for example, based on a predefined repetition threshold, e.g., a threshold of between 2-5 repetitions. For example, channel estimator 152 (FIG. 1) may determine whether or not to add one or more LOS channel estimations the pre-calculated channel autocorrelation information, e.g., as described above.

As indicated by arrow 214, the method may include repeating adding LOS channel estimations of the LOS path to the pre-calculated channel autocorrelation information. For example, channel estimator 152 (FIG. 1) may add the one or more LOS channel estimations to the pre-calculated channel autocorrelation information, e.g., as described above.

As indicated at block 216, the method may include saving the pre-calculated channel autocorrelation information as the channel autocorrelation information, for example, upon reaching the repetition threshold. For example, channel estimator 152 (FIG. 1) may save the recalculated channel information as statistical channel information 156 (FIG. 1), for example, upon reaching the repetition threshold, e.g., as described above.

Figure 3:
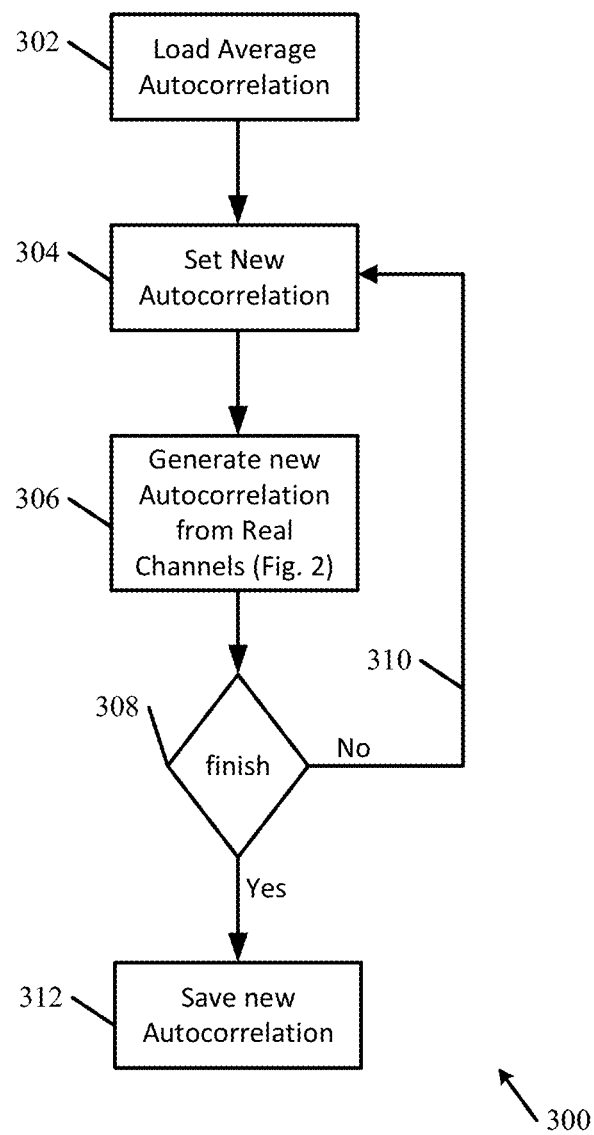
FIG. 3 is a schematic flow-chart illustration of a method of updating the channel autocorrelation information, in accordance with some demonstrative embodiments.

Reference is made to FIG. 3, which schematically illustrates a method 300 of updating channel autocorrelation information, in accordance with some demonstrative embodiments. For example, one or more of the operations of the method of FIG. 3 may be performed by a wireless communication system, e.g., system 100 (FIG. 1); an AP, e.g., AP 140 (FIG. 1); a radio, e.g., radio 144 (FIG. 1); a channel estimator, e.g., channel estimator 152 (FIG. 1); and/or a range measurement module, e.g., range measurement module 142 (FIG. 1).

As indicated at block 302, the method may include loading channel autocorrelation information. For example, channel estimator 152 (FIG. 1) may upload statistical channel information 156 (FIG. 1), e.g., from memory 184 (FIG. 1).

As indicated at block 304, the method may include beginning an update to the channel autocorrelation information. For example, channel estimator 152 (FIG. 1) may begin to update statistical channel information 156 (FIG. 1), e.g., as described above.

As indicated at block 306, the method may include updating the channel autocorrelation information by repeating the operations of the method 200 (FIG. 2) for one or more times ("iterations"). For example, channel estimator 152 (FIG. 1) may update statistical channel information 156 (FIG. 1) by performing one or more of the operations of method 200 (FIG. 2), e.g., as described above.

In some demonstrative embodiments, an iteration, e.g., each iteration, may include determining one or more LoS channel estimations, for example, using the channel autocorrelation information, which has been determined in a previous iteration, and determining updated channel autocorrelation information by updating the channel autocorrelation information of the previous iteration based on the determined LoS channel estimations, e.g., as described above.

As indicated at block 308, the method may include determining whether or not to repeat updating the channel autocorrelation information, for example, based on an autocorrelation update threshold, for example, a threshold of between two to five iterations, e.g., a threshold of 2-3 times, or any other number of iterations. For example, channel estimator 152 (FIG. 1) may determine whether or not to continue to update statistical channel information 156 (FIG. 1), e.g., as described above.

As indicated by arrow 310, the method may include repeating updating the channel autocorrelation information. For example, channel estimator 152 (FIG. 1) may repeat to update statistical channel information 156 (FIG. 1) for at least one iteration, for example, between two to five iterations, e.g., 2-3 iterations.

As indicated at block 312, the method may include saving the updated channel autocorrelation information, for example, when the number of repetitions reaches the autocorrelation update threshold. For example, channel estimator 152 (FIG. 1) may save the updated statistical channel information 156 (FIG. 1), for example, when a number of updates of statistical channel information 156 (FIG. 1) reach the autocorrelation update threshold.

Figure 4:
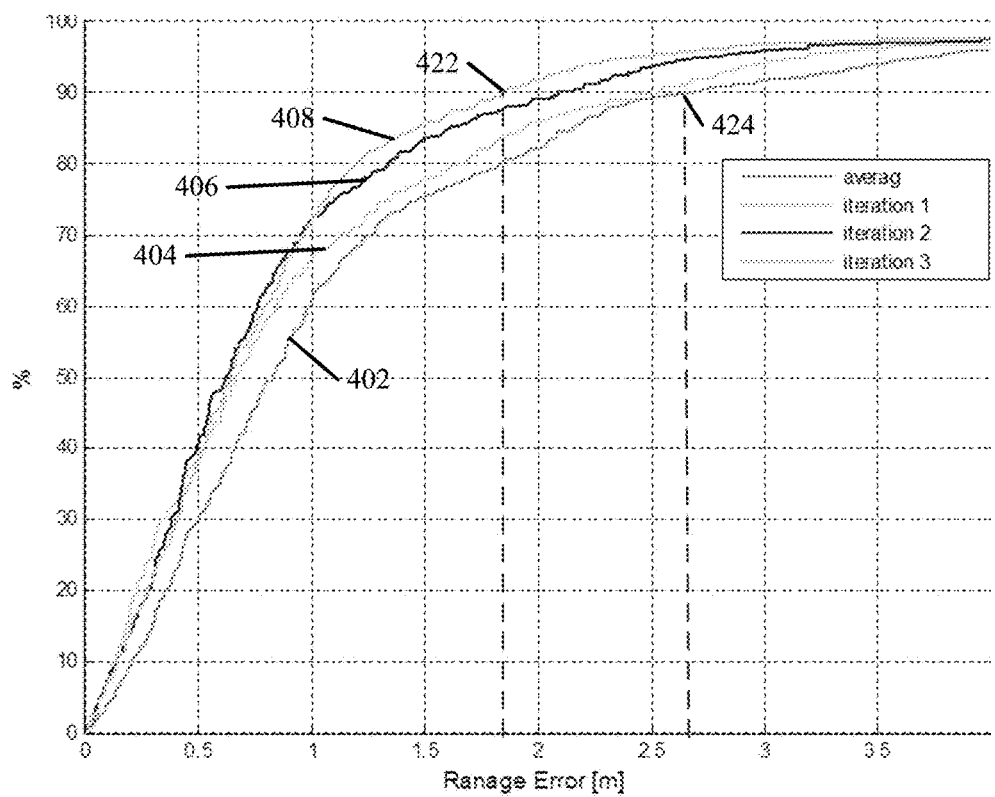
FIG. 4 is a schematic illustration of a graph depicting a range error versus a percentage of range measurements, in accordance with some demonstrative embodiments.

Reference in made to FIG. 4, which schematically illustrates a performance graph 400, depicting a range error of an estimated range between a mobile device and an AP versus a percentage of measurements, in accordance with some demonstrative embodiments. For example, the mobile device may perform the functionality of device 102 (FIG. 1), and/or the AP may perform the functionality of AP 140 (FIG. 1).

In some demonstrative embodiments, graph 400 may represent performance of range estimator 122 (FIG. 1) when estimating the range between device 102 (FIG. 1) and AP 140 (FIG. 1) using four different types of statistical channel information.

As shown in FIG. 4, graph 400 depicts a first curve 402, which represents performance of range estimator 122 (FIG. 1), for example, when estimating the range between AP 140 (FIG. 1) and device 102 (FIG. 1) using the pre-calculated average channel autocorrelation information.

As shown in FIG. 4, graph 400 depicts a second curve 404, which represents performance of range estimator 122 (FIG. 1), for example, when estimating the range between AP 140 (FIG. 1) and device 102 (FIG. 1) using statistical channel information 156 (FIG. 1) after one iteration of the operations of method 300 (FIG. 3).

As shown in FIG. 4, graph 400 depicts a third curve 406, which represents performance of range estimator 122 (FIG. 1), for example, when estimating the range between AP 140 (FIG. 1) and device 102 (FIG. 1) using statistical channel information 156 (FIG. 1) after two iterations of the operations of method 300 (FIG. 3).

As shown in FIG. 4, graph 400 depicts a fourth curve 408, which represents performance of range estimator 122 (FIG. 1) when estimating the range between AP 140 (FIG. 1) and device 102 (FIG. 1) using statistical channel information 156 (FIG. 1) after three iterations of the operations of method 300 (FIG. 3).

As shown in graph 400, at a point 422 range estimator 122 (FIG. 1) may have an accuracy of 2.7 meters at 90 percent of the measurements, for example, if range estimator 122 (FIG. 1) estimates the range to AP 140 (FIG. 1) based on the average channel autocorrelation information.

As shown in graph 400, at a point 424 range estimator 122 (FIG. 1) has an accuracy of 1.8 meters at 90 percent of the measurements, for example, if range estimator 122 (FIG. 1) estimates the range to AP 140 (FIG. 1) based on statistical channel information 156 (FIG. 1) after three iterations of the operations of method 300 (FIG. 3).

According to these examples, range estimator 122 (FIG. 1) may improve an accuracy of the estimated range by approximately 0.8 meters.

Figure 5:
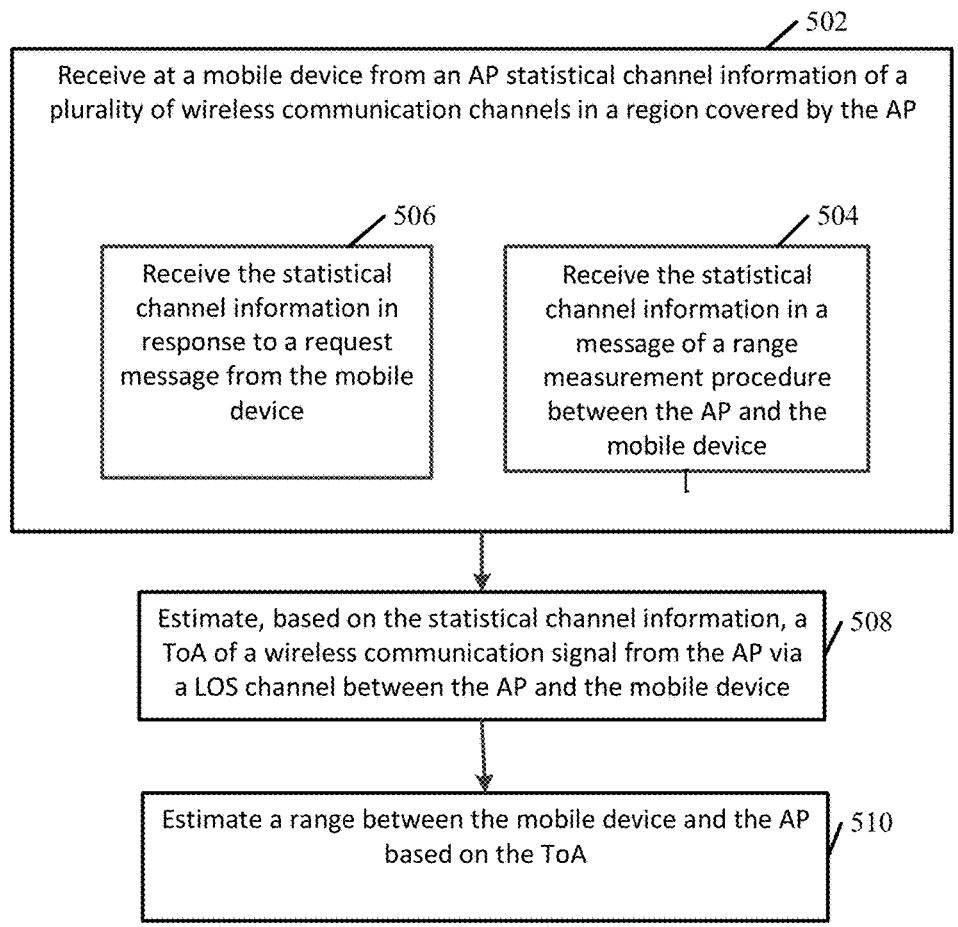
FIG. 5 is a schematic flow-chart illustration of a method of range estimation, in accordance with some demonstrative embodiments.

Reference is now made to FIG. 5, which schematically illustrates a method of range measurement, in accordance with some demonstrative embodiments. For example, one or more of the operations of the method of FIG. 5 may be performed by a wireless communication system, e.g., system 100 (FIG. 1); a wireless communication device, e.g., device 102 (FIG. 1); an AP, e.g., AP 140 (FIG. 1); a radio, e.g., radio 114 (FIG. 1); a channel estimator, e.g., channel estimator 124 (FIG. 1); and/or a range estimator, e.g., range estimator 122 (FIG. 1).

As indicated at block 502, the method may include receiving at a mobile device statistical channel information from an AP of a plurality of wireless communication channels in a region covered by the AP. For example, device 102 (FIG. 1) may receive from AP 140 (FIG. 1) statistical channel information 156 (FIG. 1) of a plurality of wireless communication channels in the region covered by AP 140 (FIG. 1), e.g., as described above.

As indicated at block 504, receiving the statistical channel information from the AP may include receiving the statistical channel information in response to a request message from the mobile device. For example, device 102 (FIG. 1) may receive statistical channel information 156 (FIG. 1) from AP 140 (FIG. 1), for example, in response to a request message from device 102 (FIG. 1), e.g., as described above.

As indicated at block 506, receiving the statistical channel information from the AP may include receiving the statistical channel information in a message of a range measurement procedure between the AP and the mobile device. For example, device 102 (FIG. 1) may receive statistical channel information 156 (FIG. 1) from AP 140 (FIG. 1) in the message of the FTM procedure or the ToF procedure, e.g., as described above.

As indicated at block 508, the method may include estimating, based on the statistical channel information, a ToA of a wireless communication signal from the AP via a LOS channel between the AP and the mobile device. For example, channel estimator 124 (FIG. 1) may estimate the ToA of the wireless communication signal from AP 140 (FIG. 1) via the LOS channel between AP 140 (FIG. 1) and device 102 (FIG. 1), for example, based on statistical channel information 156 (FIG. 1), e.g., as described above.

As indicated at block 510, the method may include estimating a range between the mobile device and the AP based on the ToA. For example, range estimator 122 (FIG. 1) may estimate the range between AP 140 (FIG. 1) and device 102 (FIG. 1), for example, based on the ToA, e.g., as described above.

Figure 6:
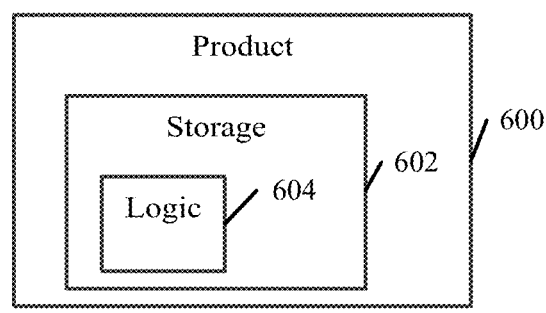
FIG. 6 is a schematic illustration of a product of manufacture, in accordance with some demonstrative embodiments.

Reference is made to FIG. 6, which schematically illustrates a product of manufacture 600, in accordance with some demonstrative embodiments. Product 600 may include a non-transitory machine-readable storage medium 602 to store logic 604, which may be used, for example, to perform at least part of the functionality of device 102 (FIG. 1), AP 140 (FIG. 1), radios 114 and/or 144 (FIG. 1), channel estimators 124 and/or 152 (FIG. 1), range estimator 122 (FIG. 1), range measurement module 142 (FIG. 1), message processors 128 and/or 158 (FIG. 1), and/or to perform one or more operations of the methods of FIGS. 2, 3 and/or 5. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a mobile device comprising a radio to receive from an Access Point (AP) statistical channel information of a plurality of wireless communication channels in a region covered by the AP; a channel estimator to estimate, based on the statistical channel information, a time of arrival (ToA) of a wireless communication signal from the AP via a line of sight (LOS) channel between the AP and the mobile device; and a range estimator to estimate a range between the mobile device and the AP based on the ToA.

Example 2 includes the subject matter of Example 1, and optionally, wherein the statistical channel information includes channel autocorrelation information.

Example 3 includes the subject matter of Example 1 or 2, and optionally, wherein the radio is to receive the statistical channel information in a message of a range measurement procedure between the AP and the mobile device.

Example 4 includes the subject matter of Example 3, and optionally, wherein the range measurement procedure includes a Fine Timing Measurement (FTM) procedure.

Example 5 includes the subject matter of Example 3, and optionally, wherein the range measurement procedure includes a Time of Flight (ToF) measurement procedure.

Example 6 includes the subject matter of Example 1 or 2, and optionally, wherein the radio is to receive the statistical channel information in a periodic broadcast massage from the AP.

Example 7 includes the subject matter of Example 1 or 2, and optionally, wherein the radio is to send to the AP a request message to request the statistical channel information, and to receive the statistical channel information in response to the request message.

Example 8 includes the subject matter of any one of Examples 1-7, and optionally, comprising one or more antennas; a memory; and a processor.

Example 9 includes an access point (AP) comprising a channel estimator to determine statistical channel information of a region covered by the AP based on channel estimations of a plurality of wireless communication channels between the AP and one or more wireless communication devices in the region; and a radio to send the statistical channel information to a mobile device in the region.

Example 10 includes the subject matter of Example 9, and optionally, wherein the channel estimator is to determine the statistical channel information based on a plurality of line of sight (LOS) estimations of a plurality of LOS paths between the AP and the one or more wireless communication devices.

Example 11 includes the subject matter of Example 10, and optionally, wherein the channel estimator is to dynamically update the statistical channel information based on one or more changes selected from the croup consisting of a change in the plurality of channel estimations and a change in the plurality of LOS estimations.

Example 12 includes the subject matter of any one of Examples 9-11, and optionally, wherein the channel estimator is to estimate a time of arrival (ToA) of a wireless communication signal from a device of the wireless communication devices via a line of sight (LOS) path between the AP and the device, and to update the statistical channel information based on the TOA.

Example 13 includes the subject matter of Example 12, and optionally, wherein the radio is to communicate a Multiple In Multiple Out (MIMO) communication over two or more MIMO channels, the channel estimator is to estimate the ToA via the LOS path based on channel estimations of the two or more MIMO channels.

Example 14 includes the subject matter of any one of Examples 9-13, and optionally, wherein the statistical channel information includes channel autocorrelation information.

Example 15 includes the subject matter of any one of Examples 9-14, and optionally, wherein the channel estimator is to determine the statistical channel information by applying the channel estimations to a precalculated statistical channel information.

Example 16 includes the subject matter of any one of Examples 9-15, and optionally, comprising a range measurement module to perform a range measurement procedure to measure a range between the AP and the mobile device.

Example 17 includes the subject matter of Example 16, and optionally, wherein the range measurement procedure includes a Fine Timing Measurement (FTM).

Example 18 includes the subject matter of Example 16, and optionally, wherein the range measurement procedure includes a Time of Flight (ToF) measurement procedure.

Example 19 includes the subject matter of any one of Examples 16-18, and optionally, wherein the radio is to send the statistical channel information in a message of the range measurement procedure.

Example 20 includes the subject matter of any one of Examples 9-15, and optionally, wherein the radio is to send the statistical channel information in a periodic broadcast massage.

Example 21 includes the subject matter of any one of Examples 9-15, and optionally, wherein the radio is to receive a request message from the mobile device to request the statistical channel information, and to send to the mobile device the statistical channel information in response to the request message.

Example 22 includes the subject matter of any one of Examples 9-21, and optionally, comprising one or more antennas; a memory; and a processor.

Example 23 includes a system including a mobile device, the mobile device comprising one or more antennas; a memory; a processor; a radio to receive from an Access Point (AP) statistical channel information of a plurality of wireless communication channels in a region covered by the AP; a channel estimator to estimate, based on the statistical channel information, a time of arrival (ToA) of a wireless communication signal from the AP via a line of sight (LOS) channel between the AP and the mobile device; and a range estimator to estimate a range between the mobile device and the AP based on the ToA.

Example 24 includes the subject matter of Example 23, and optionally, wherein the statistical channel information includes channel autocorrelation information.

Example 25 includes the subject matter of Example 23 or 24, and optionally, wherein the radio is to receive the statistical channel information in a message of a range measurement procedure between the AP and the mobile device.

Example 26 includes the subject matter of Example 25, and optionally, wherein the range measurement procedure includes a Fine Timing Measurement (FTM) procedure.

Example 27 includes the subject matter of Example 25, and optionally, wherein the range measurement procedure includes a Time of Flight (ToF) measurement procedure.

Example 28 includes the subject matter of Example 23 or 24, and optionally, wherein the radio is to receive the statistical channel information in a periodic broadcast massage from the AP.

Example 29 includes the subject matter of Example 23 or 24, and optionally, wherein the radio is to send to the AP a request message to request the statistical channel information, and to receive the statistical channel information in response to the request message.

Example 30 includes a system including an Access Point (AP), the AP comprising one or more antennas; a processor; a memory; a channel estimator to determine statistical channel information of a region covered by the AP based on channel estimations of a plurality of wireless communication channels between the AP and one or more wireless communication devices in the region; and a radio to send the statistical channel information to a mobile device in the region.

Example 31 includes the subject matter of Example 30, and optionally, wherein the channel estimator is to determine the statistical channel information based on a plurality of line of sight (LOS) estimations of a plurality of LOS paths between the AP and the one or more wireless communication devices.

Example 32 includes the subject matter of Example 31, and optionally, wherein the channel estimator is to dynamically update the statistical channel information based on one or more changes selected from the croup consisting of a change in the plurality of channel estimations and a change in the plurality of LOS estimations.

Example 33 includes the subject matter of any one of Examples 30-32, and optionally, wherein the channel estimator is to estimate a time of arrival (ToA) of a wireless communication signal from a device of the wireless communication devices via a line of sight (LOS) path between the AP and the device, and to update the statistical channel information based on the TOA.

Example 34 includes the subject matter of Example 33, and optionally, wherein the radio is to communicate a Multiple In Multiple Out (MIMO) communication over two or more MIMO channels, the channel estimator is to estimate the ToA via the LOS path based on channel estimations of the two or more MIMO channels.

Example 35 includes the subject matter of any one of Examples 30-34, and optionally, wherein the statistical channel information includes channel autocorrelation information.

Example 36 includes the subject matter of any one of Examples 30-35, and optionally, wherein the channel estimator is to determine the statistical channel information by applying the channel estimations to a pre-calculated statistical channel information.

Example 37 includes the subject matter of any one of Examples 30-36, and optionally, wherein the AP comprises a range measurement module to perform a range measurement procedure to measure a range between the AP and the mobile device.

Example 38 includes the subject matter of Example 37, and optionally, wherein the range measurement procedure includes a Fine Timing Measurement (FTM).

Example 39 includes the subject matter of Example 37, and optionally, wherein the range measurement procedure includes a Time of Flight (ToF) measurement procedure.

Example 40 includes the subject matter of any one of Examples 37-39, and optionally, wherein the radio is to send the statistical channel information in a message of the range measurement procedure.

Example 41 includes the subject matter of any one of Examples 30-36, and optionally, wherein the radio is to send the statistical channel information in a periodic broadcast massage.

Example 42 includes the subject matter of any one of Examples 30-36, and optionally, wherein the radio is to receive a request message from the mobile device to request the statistical channel information, and to send to the mobile device the statistical channel information in response to the request message.

Example 43 includes a method to be performed at a mobile device, the method comprising receiving from an Access Point (AP) statistical channel information of a plurality of wireless communication channels in a region covered by the AP; estimating, based on the statistical channel information, a time of arrival (ToA) of a wireless communication signal from the AP via a line of sight (LOS) channel between the AP and the mobile device; and estimating a range between the mobile device and the AP based on the ToA.

Example 44 includes the subject matter of Example 43, and optionally, wherein the statistical channel information includes channel autocorrelation information.

Example 45 includes the subject matter of Example 43 or 44, and optionally, comprising receiving the statistical channel information in a message of a range measurement procedure between the AP and the mobile device.

Example 46 includes the subject matter of Example 45, and optionally, wherein the range measurement procedure includes a Fine Timing Measurement (FTM) procedure.

Example 47 includes the subject matter of Example 45, and optionally, wherein the range measurement procedure includes a Time of Flight (ToF) measurement procedure.

Example 48 includes the subject matter of Example 43 or 44, and optionally, comprising receiving the statistical channel information in a periodic broadcast massage from the AP.

Example 49 includes the subject matter of Example 43 or 44, and optionally, comprising sending to the AP a request message to request the statistical channel information, and receiving the statistical channel information in response to the request message.

Example 50 includes a method to be performed at an Access Point (AP), the method comprising determining statistical channel information of a region covered by the AP based on channel estimations of a plurality of wireless communication channels between the AP and one or more wireless communication devices in the region; and sending the statistical channel information to a mobile device in the region.

Example 51 includes the subject matter of Example 50, and optionally, comprising determining the statistical channel information based on a plurality of line of sight (LOS) estimations of a plurality of LOS paths between the AP and the one or more wireless communication devices.

Example 52 includes the subject matter of Example 51, and optionally, comprising dynamically updating the statistical channel information based on one or more changes selected from the croup consisting of a change in the plurality of channel estimations and a change in the plurality of LOS estimations.

Example 53 includes the subject matter of any one of Examples 50-52, and optionally, comprising estimating a time of arrival (ToA) of a wireless communication signal from a device of the wireless communication devices via a line of sight (LOS) path between the AP and the device, and to update the statistical channel information based on the TOA.

Example 54 includes the subject matter of Example 53, and optionally, comprising communicating a Multiple In Multiple Out (MIMO) communication over two or more MIMO channels, and estimating the ToA via the LOS path based on channel estimations of the two or more MIMO channels.

Example 55 includes the subject matter of any one of Examples 50-54, and optionally, wherein the statistical channel information includes channel autocorrelation information.

Example 56 includes the subject matter of any one of Examples 50-55, and optionally, comprising determining the statistical channel information by applying the channel estimations to a pre-calculated statistical channel information.

Example 57 includes the subject matter of any one of Examples 50-56, and optionally, comprising performing a range measurement procedure to measure a range between the AP and the mobile device.

Example 58 includes the subject matter of Example 57, and optionally, wherein the range measurement procedure includes a Fine Timing Measurement (FTM).

Example 59 includes the subject matter of Example 57, and optionally, wherein the range measurement procedure includes a Time of Flight (ToF) measurement procedure.

Example 60 includes the subject matter of any one of Examples 57-59, and optionally, comprising sending the statistical channel information in a message of the range measurement procedure.

Example 61 includes the subject matter of any one of Examples 50-56, and optionally, comprising sending the statistical channel information in a periodic broadcast massage.

Example 62 includes the subject matter of any one of Examples 50-56, and optionally, comprising receiving a request message from the mobile device to request the statistical channel information, and sending to the mobile device the statistical channel information in response to the request message.

Example 63 includes a product including one or more tangible computer-readable non-transitory storage media comprising computer-executable instructions operable to, when executed by at least one computer processor, enable the at least one computer processor to implement a method at a mobile device, the method comprising receiving from an Access Point (AP) statistical channel information of a plurality of wireless communication channels in a region covered by the AP; estimating, based on the statistical channel information, a time of arrival (ToA) of a wireless communication signal from the AP via a line of sight (LOS) channel between the AP and the mobile device; and estimating a range between the mobile device and the AP based on the ToA.

Example 64 includes the subject matter of Example 63, and optionally, wherein the statistical channel information includes channel autocorrelation information.

Example 65 includes the subject matter of Example 63 or 64, and optionally, wherein the method comprises receiving the statistical channel information in a message of a range measurement procedure between the AP and the mobile device.

Example 66 includes the subject matter of Example 65, and optionally, wherein the range measurement procedure includes a Fine Timing Measurement (FTM) procedure.

Example 67 includes the subject matter of Example 65, and optionally, wherein the range measurement procedure includes a Time of Flight (ToF) measurement procedure.

Example 68 includes the subject matter of Example 63 or 64, and optionally, wherein the method comprises receiving the statistical channel information in a periodic broadcast massage from the AP.

Example 69 includes the subject matter of Example 63 or 64, and optionally, wherein the method comprises sending to the AP a request message to request the statistical channel information, and receiving the statistical channel information in response to the request message.

Example 70 includes a product including one or more tangible computer-readable non-transitory storage media comprising computer-executable instructions operable to, when executed by at least one computer processor, enable the at least one computer processor to implement a method at an Access Point (AP), the method comprising determining statistical channel information of a region covered by the AP based on channel estimations of a plurality of wireless communication channels between the AP and one or more wireless communication devices in the region; and sending the statistical channel information to a mobile device in the region.

Example 71 includes the subject matter of Example 70, and optionally, wherein the method comprises determining the statistical channel information based on a plurality of line of sight (LOS) estimations of a plurality of LOS paths between the AP and the one or more wireless communication devices.

Example 72 includes the subject matter of Example 71, and optionally, wherein the method comprises dynamically updating the statistical channel information based on one or more changes selected from the croup consisting of a change in the plurality of channel estimations and a change in the plurality of LOS estimations.

Example 73 includes the subject matter of any one of Examples 70-72, and optionally, wherein the method comprises estimating a time of arrival (ToA) of a wireless communication signal from a device of the wireless communication devices via a line of sight (LOS) path between the AP and the device, and to update the statistical channel information based on the TOA.

Example 74 includes the subject matter of Example 73, and optionally, wherein the method comprises communicating a Multiple In Multiple Out (MIMO) communication over two or more MIMO channels, and estimating the ToA via the LOS path based on channel estimations of the two or more MIMO channels.

Example 75 includes the subject matter of any one of Examples 70-74, and optionally, wherein the statistical channel information includes channel autocorrelation information.

Example 76 includes the subject matter of any one of Examples 70-75, and optionally, wherein the method comprises determining the statistical channel information by applying the channel estimations to a pre-calculated statistical channel information.

Example 77 includes the subject matter of any one of Examples 70-76, and optionally, wherein the method comprises performing a range measurement procedure to measure a range between the AP and the mobile device.

Example 78 includes the subject matter of Example 77, and optionally, wherein the range measurement procedure includes a Fine Timing Measurement (FTM).

Example 79 includes the subject matter of Example 77, and optionally, wherein the range measurement procedure includes a Time of Flight (ToF) measurement procedure.

Example 80 includes the subject matter of any one of Examples 77-79, and optionally, wherein the method comprises sending the statistical channel information in a message of the range measurement procedure.

Example 81 includes the subject matter of any one of Examples 70-76, and optionally, wherein the method comprises sending the statistical channel information in a periodic broadcast massage.

Example 82 includes the subject matter of any one of Examples 70-76, and optionally, wherein the method comprises receiving a request message from the mobile device to request the statistical channel information, and sending to the mobile device the statistical channel information in response to the request message.

Example 83 includes an apparatus of wireless communication at a mobile device, the apparatus comprising means for receiving from an Access Point (AP) statistical channel information of a plurality of wireless communication channels in a region covered by the AP; means for estimating, based on the statistical channel information, a time of arrival (ToA) of a wireless communication signal from the AP via a line of sight (LOS) channel between the AP and the mobile device; and means for estimating a range between the mobile device and the AP based on the ToA.

Example 84 includes the subject matter of Example 83, and optionally, wherein the statistical channel information includes channel autocorrelation information.

Example 85 includes the subject matter of Example 83 or 84, and optionally, comprising means for receiving the statistical channel information in a message of a range measurement procedure between the AP and the mobile device.

Example 86 includes the subject matter of Example 85, and optionally, wherein the range measurement procedure includes a Fine Timing Measurement (FTM) procedure.

Example 87 includes the subject matter of Example 85, and optionally, wherein the range measurement procedure includes a Time of Flight (ToF) measurement procedure.

Example 88 includes the subject matter of Example 83 or 84, and optionally, comprising means for receiving the statistical channel information in a periodic broadcast massage from the AP.

Example 89 includes the subject matter of Example 83 or 84, and optionally, comprising means for sending to the AP a request message to request the statistical channel information, and means for receiving the statistical channel information in response to the request message.

Example 90 includes an apparatus of wireless communication at an Access Point (AP), the method comprising means for determining statistical channel information of a region covered by the AP based on channel estimations of a plurality of wireless communication channels between the AP and one or more wireless communication devices in the region; and means for sending the statistical channel information to a mobile device in the region.

Example 91 includes the subject matter of Example 90, and optionally, comprising means for determining the statistical channel information based on a plurality of line of sight (LOS) estimations of a plurality of LOS paths between the AP and the one or more wireless communication devices.

Example 92 includes the subject matter of Example 91, and optionally, comprising means for dynamically updating the statistical channel information based on one or more changes selected from the croup consisting of a change in the plurality of channel estimations and a change in the plurality of LOS estimations.

Example 93 includes the subject matter of any one of Examples 90-92, and optionally, comprising means for estimating a time of arrival (ToA) of a wireless communication signal from a device of the wireless communication devices via a line of sight (LOS) path between the AP and the device, and means for updating the statistical channel information based on the TOA.

Example 94 includes the subject matter of Example 93, and optionally, comprising means for communicating a Multiple In Multiple Out (MIMO) communication over two or more MIMO channels, and means for estimating the ToA via the LOS path based on channel estimations of the two or more MIMO channels.

Example 95 includes the subject matter of any one of Examples 90-94, and optionally, wherein the statistical channel information includes channel autocorrelation information.

Example 96 includes the subject matter of any one of Examples 90-95, and optionally, comprising means for determining the statistical channel information by applying the channel estimations to a pre-calculated statistical channel information.

Example 97 includes the subject matter of any one of Examples 90-96, and optionally, comprising means for performing a range measurement procedure to measure a range between the AP and the mobile device.

Example 98 includes the subject matter of Example 97, and optionally, wherein the range measurement procedure includes a Fine Timing Measurement (FTM).

Example 99 includes the subject matter of Example 97, and optionally, wherein the range measurement procedure includes a Time of Flight (ToF) measurement procedure.

Example 100 includes the subject matter of any one of Examples 97-99, and optionally, comprising means for sending the statistical channel information in a message of the range measurement procedure.

Example 101 includes the subject matter of any one of Examples 90-96, and optionally, comprising means for sending the statistical channel information in a periodic broadcast massage.

Example 102 includes the subject matter of any one of Examples 90-96, and optionally, comprising means for receiving a request message from the mobile device to request the statistical channel information, and means for sending to the mobile device the statistical channel information in response to the request message.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An access point (AP) comprising:
a channel estimator to determine statistical channel information comprising channel autocorrelation information of a region covered by said AP, the channel estimator to determine the statistical channel information based on channel estimations of a plurality of wireless communication channels between said AP and one or more wireless communication devices in said region, the channel estimator to estimate a time of arrival (ToA) of a wireless communication signal from a device of said one or more wireless communication devices via a line of sight (LOS) path between said AP and said device, and to update said statistical channel information based on said ToA;
a radio to send said statistical channel information to a mobile device in said region; and
a range measurement module to perform a range measurement procedure between the AP and the mobile device, the range measurement procedure configured for range measurement of a range between said mobile device and said AP.

2. The AP of claim 1, wherein said channel estimator is to determine said statistical channel information based on a plurality of LOS estimations of a plurality of LOS paths between said AP and said one or more wireless communication devices.

3. The AP of claim 2, wherein said channel estimator is to dynamically update said statistical channel information based on one or more changes selected from the group consisting of a change in said plurality of channel estimations and a change in said plurality of LOS estimations.

4. The AP of claim 1, wherein said radio is to communicate a Multiple In Multiple Out (MIMO) communication over two or more MIMO channels, said channel estimator is to estimate said ToA via said LOS path based on channel estimations of the two or more MIMO channels.

5. The AP of claim 1, wherein said channel estimator is to determine said statistical channel information by applying said channel estimations to a precalculated statistical channel information.

6. The AP of claim 1, wherein said radio is to send said statistical channel information in a message of said range measurement procedure.

7. The AP of claim 1, wherein said radio is to send said statistical channel information in a periodic broadcast message.

8. The AP of claim 1, wherein said radio is to receive a request message from said mobile device to request said statistical channel information, and to send to said mobile device said statistical channel information in response to said request message.

9. The AP of claim 1 comprising:
one or more antennas;
a memory; and
a processor.

10. A product comprising one or more tangible computer-readable non-transitory storage media comprising computer-executable instructions operable to, when executed by at least one computer processor, enable the at least one computer processor to cause an Access Point (AP) to:
determine statistical channel information comprising channel autocorrelation information of a region covered by said AP, determining the statistical channel information comprises determining the statistical channel information based on channel estimations of a plurality of wireless communication channels between said AP and one or more wireless communication devices in said region, determining the statistical channel information comprises estimating a time of arrival (ToA) of a wireless communication signal from a device of said one or more wireless communication devices via a line of sight (LOS) path between said AP and said device, and updating said statistical channel information based on said TOA;
send said statistical channel information to a mobile device in said region; and
perform a range measurement procedure between the AP and the mobile device, the range measurement procedure configured for range measurement of a range between said mobile device and said AP.

11. The product of claim 10, wherein the instructions, when executed, cause the AP to determine said statistical channel information based on a plurality of LOS estimations of a plurality of LOS paths between said AP and said one or more wireless communication devices.

12. The product of claim 11, wherein the instructions, when executed, cause the AP to update said statistical channel information based on one or more changes selected from the group consisting of a change in said plurality of channel estimations and a change in said plurality of LOS estimations.

13. The product of claim 10, wherein the instructions, when executed, cause the AP to send said statistical channel information in a message of said range measurement procedure.

* * * * *